April 20, 1965  A. EISELE  3,178,828
INTERNAL-AND-EXTERNAL SURFACE CONCENTRICITY GAUGE
Filed Sept. 28, 1962  2 Sheets-Sheet 1
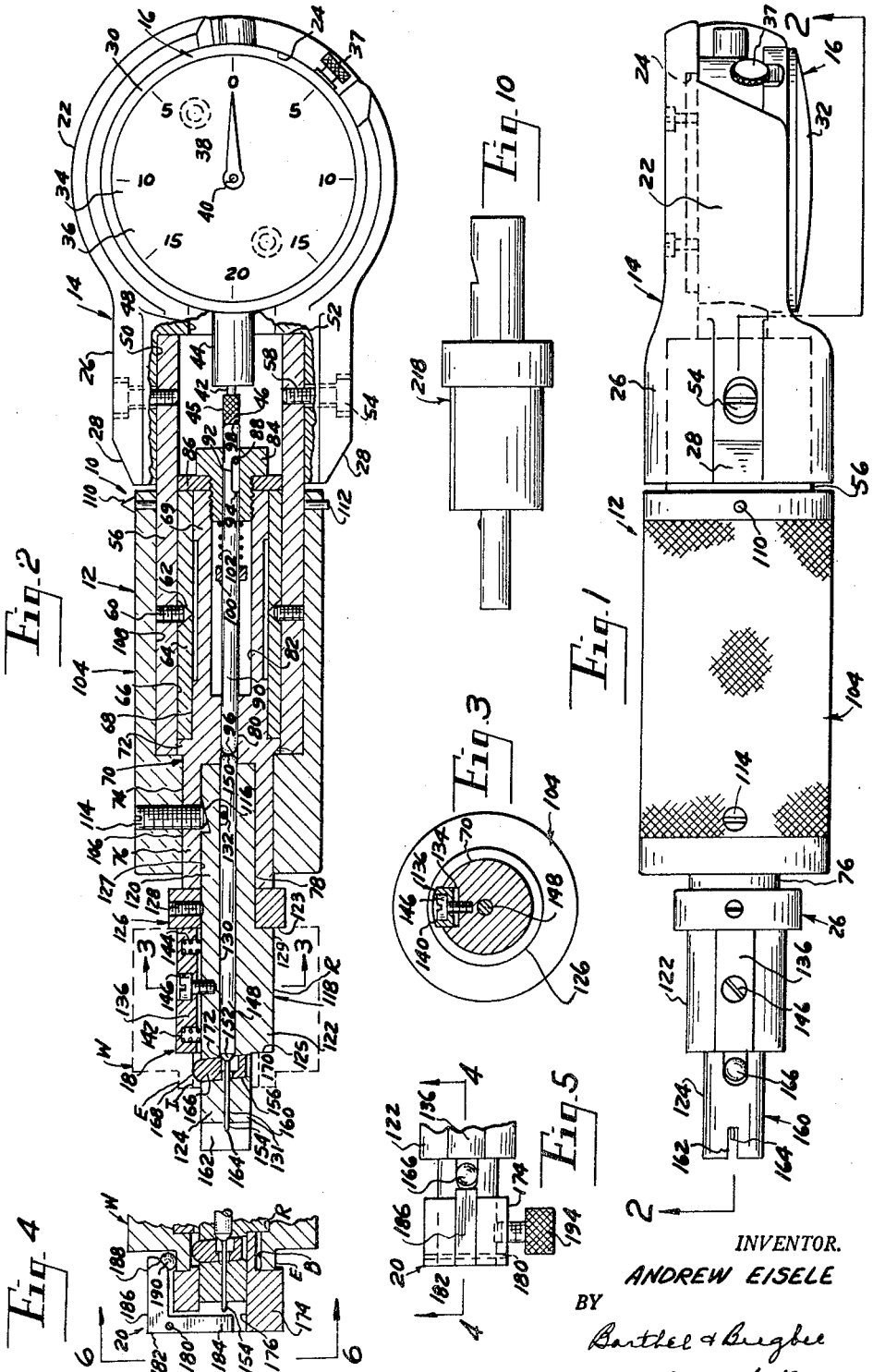
INVENTOR.
ANDREW EISELE
BY
Barthel & Bugbee
ATTORNEYS April 20, 1965 A. EISELE 3,178,828
INTERNAL-AND-EXTERNAL SURFACE CONCENTRICITY GAUGE
Filed Sept. 28, 1962 2 Sheets-Sheet 2
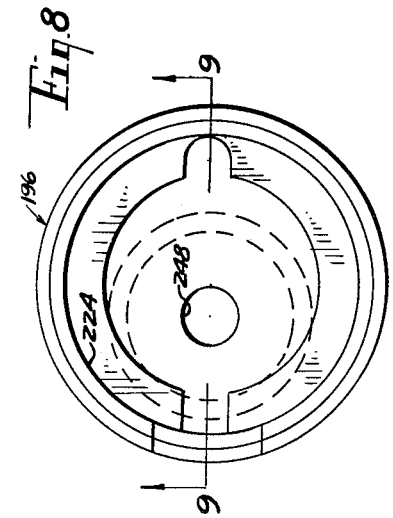
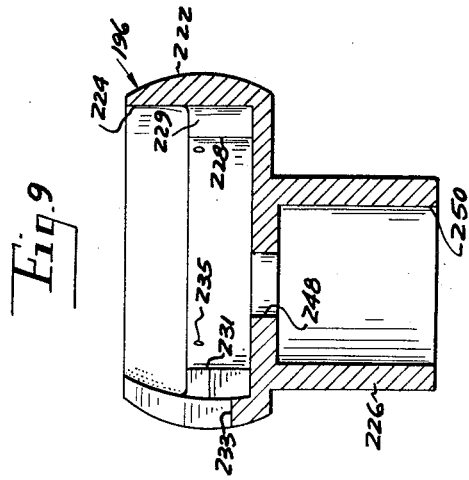
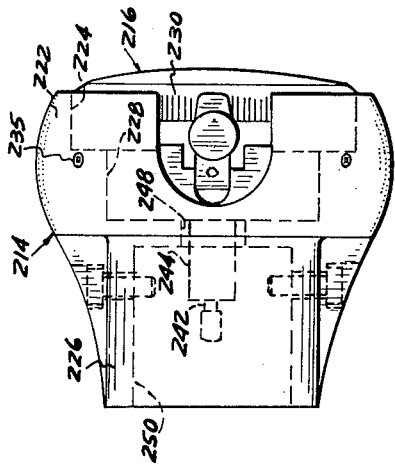
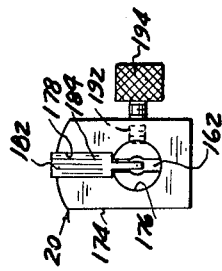
INVENTOR.
ANDREW EISELE.
BY
Barthel & Bugbee
ATTORNEYS United States Patent Office
3,178,828
Patented Apr. 20, 1965

3,178,828
INTERNAL-AND-EXTERNAL SURFACE
CONCENTRICITY GAUGE
Andrew Eisele, 15025 Cheyenne Ave., Detroit, Mich.
Filed Sept. 28, 1962, Ser. No. 226,958
16 Claims. (Cl. 33—174)

This invention relates to precision concentricity gauges and, in particular, to internal-and-external surface concentricity gauges.

One object of this invention is to provide an internal-and-external surface concentricity gauge which is adapted to measure the accuracy of concentricity of a bore or internal surface of one diameter relatively to a reference bore of another diameter and then to measure the accuracy of concentricity of an annular external surface relatively to one of the previously-mentioned bores.

Another object is to provide an internal-and-external surface concentricity gauge of the foregoing character wherein the external surface concentricity is measured by means of an attachment to the bore concentricity gauge whereby the latter is utilized for both external and internal surface concentricity measurements.

Another object is to provide an internal-and-external surface concentricity gauge of the foregoing character wherein the reference bore in the workpiece is engaged by a pilot portion on the forward part of the concentricity gauge, which projects though the reference bore into the bore to be measured.

Another object is to provide an internal-and-external surface concentricity gauge of the foregoing character wherein concentricity measurements are revealed on a dial indicator protected against damage by a handle forming a shield in which it is inserted.

Another object is to provide an internal-and-external surface concentricity gauge of the foregoing character which is adaptable to the measurement of concentricity of internal and external surfaces in several different ranges, each range being covered by a measuring head insertable in the instrument and adapted to be interchangeable with other measuring heads for measuring different ranges of diameters for concentricity.

Other objects and advantages of the invention will become apparent during the course of the folowing description of the accompanying drawings, wherein:

FIGURE 1 is a top plan view of an internal-and-external surface concentricity gauge, according to one form of the invention, with the external concentricity measuring attachment removed, and equipped with a horizontal handle holding a horizontal dial indicator;

FIGURE 2 is a vertical section, partly in side elevation, taken along the line 2—2 in FIGURE 1;

FIGURE 3 is a cross-section taken along the line 3—3 in FIGURE 2;

FIGURE 4 is a central vertical longitudinal section similar to the left-hand end of FIGURE 2, but showing the external surface concentricity measuring attachment mounted on the concentricity gauge, taken along the line 4—4 in FIGURE 5;

FIGURE 5 is a top plan view of the mechanism shown in FIGURE 4;

FIGURE 6 is a front elevation of the external surface concentricity measuring attachment looking in the direction of the line 6—6 in FIGURE 4;

FIGURE 7 is a top plan view of a modified vertical dial indicator handle holding a vertical dial indicator;

FIGURE 8 is a right-hand end elevation of the vertical handle shown in FIGURE 7;

FIGURE 9 is a longitudinal section taken along the line 9—9 in FIGURE 8; and

FIGURE 10 is a side elevation of a measuring head adapted to fit a different diameter of workpiece.

Referring to the drawings in detail, FIGURES 1 and 2 show an internal-and-external surface concentricity gauge, generally designated 10, according to one form of the invention, as consisting generally of a measuring unit 12 which at its rearward end carries a stationary hollow horizontal handle 14 containing a conventional horizontal dial indicator 16 positioned approximately in the plane through the axis of the measuring unit 12. The measuring unit 12 at its forward end is adapted to receive any one of a plurality of interchangeable measuring heads, generally designated 18, of different diameters for fitting different sizes of bores, such as the differently-sized but interchangeable measuring heads shown in FIGURE 10 and generally designated 218.

Adapted to be removably attached to each measuring head 18 or 218 is an external surface concentricity measuring attachment, generally designated 20, shown in its attached position in FIGURES 4, 5 and 6 but detached from the instrument in FIGURES 1 and 2. The workpiece W which is to be measured for such concentricity has an enlarged reference bore or counterbore R relative to which a smaller bore or internal surface I is intendedly coaxial. The bore I, in turn, is surrounded by an intendedly coaxial annular external surface E. The concentricity of the external surface E and the internal surface I are to be measured relative to the reference bore R with the aid of the present instrument 10, first using the instrument 10 without the attachment 20 for measuring the concentricity of the internal surface I, and afterward installing the attachment 20 to measure the concentricity of the external surface E.

The handle 14 containing the dial indicator 16 includes a body portion 22 of approximately cylindrical shape containing an approximately cylindrical recess or socket 24 (FIGURE 1) which receives the dial indicator 16; and also includes a hollow tubular shank 26, also of roughly cylindrical shape but with its axis substantially perpendicular to the axis of the approximately cylindrical recess 24 for the dial indicator 16. The shank 26 is provided with a beveled annular end surface 28 adapted to carry reference marks (not shown) by which the rotation of the forward portion of the measuring unit 12 relative to its rearward portion is indicated on the handle 14 attached to such rearward portion, as explained in more detail below.

The dial indicator 16 is of conventional design and consists of a generally cylindrical casing 30 containing a transparent crystal 32 covering a graduated rotatable dial 34 with a circular scale 36 locked in position by a thumb-screw 37. Registering with the graduations 36 is a pointer 38 mounted on a rotary shaft 40 connected by conventional motion-multiplying mechanism (not shown) to a reciprocable dial indicator operating plunger 42 reciprocably mounted within a tubular stem 44 secured to and projecting radially from the casing 30 of the dial indicator 16. The plunger 42 terminates in a plunger head 45 with a rounded contact surface 46 at its outer end. Reciprocatory motion of the plunger 42 is registered on the scale 36 by the pointer 38, and the scale 36 is graduated in any convenient manner, such as in thousandths or ten-thousandths of an inch, in order to indicate the amount of the measurement, which in the present instance is the departure from concentricity of the internal surface I and/or the external surface E from the reference bore R of the workpiece W.

The handle 14 is provide with a bore 48 (FIGURE 1) leading from the recess 24 into a counterbore or socket 50 within the hollow shank 26, and separated from the bore 48 by a radial annular shoulder 52. The shank 26 is also drilled radially at circumferentially-spaced intervals, such as diametrically, to receive set screws 54. Seated within the counterbore 50 against the annular shoulder 52 is the rearward end of a tubular stationary barrel or rearward portion 56 of the measuring unit 12 similarly drilled and theaded as at 58 to receive the threaded shanks of the set screws 54 and thus be firmly but detachably connected to the handle 14. The barrel 56 is also drilled and threaded at diametrically opposite locations to receive headless set screws 60 which engage correspondingly-located conical indentations 62 in a sleeve 64 which is thus snugly but removably held in a fixed location within the bore 66 of the barrel 56. The sleeve 64 in turn is snugly fitted over the cylindrical outer surface 68 of the rearward part 69 of a rotary tubular stem, generally designated 70, against an annular flange 72 between the surface 68 and a larger diameter cylindrical forward surface 74, the flange 72 fitting snugly within the bore 66 of the barrel 56 at the forward end thereof. The cylindrical surface 68 is relieved intermediate its opposite ends to insure accuracy of fit.

The forward part 76 of the rotary tubular stem 70 carrying the enlarged diameter cylindrical surface 74 is provided with a counterbore 78 which is coaxial with and communicates with a bore 80 leading into a counterbore 82 within the rearward part 69 of the rotary tubular stem 70. The rearward end of the counterbore 82 is threaded to receive a flanged closure plug 84 passing through a stop washer 86 which retains the sleeve 64 in a fixed position. The plug 84 is provided with a bore 88 coaxial with the bore 80 and preferably of the same diameter so as to snugly but slidably receive a rearward motion-transmitting rod 90 reciprocably mounted therein. The rod 90 is provided with a flattened cutaway portion 92 engaged by a cross pin 94 to prevent rotation of the rod 90, the pin 94 being seated in the plug 84, which is drilled transversely for that purpose. The rearward motion-transmitting rod 90 has rounded forward and rearward contact ends 96 and 98 respectively, the latter being engageable with the contact surface 46 on the dial indicator plunger 42. Fixedly mounted on the rearward motion-transmitting rod 90 is a stop collar 100 for the forward end of a helical compression spring 102, the rearward end of which abuts the threaded plug 84.

Rotatably mounted upon the hollow tubular stem 70 is a tubular rotary handle, generally designated 104, containing a bore 106 rotatably slidably engageable with the cylindrical surface 74 on the forward part 76 of the stem 70; and also containing a counterbore 108 similarly snugly but rotatably slidably receiving the barrel 56. The rotary handle 104 is drilled at diametrically opposite locations near its rearward end to receive a sharp pointer 110 and a blunt pointer 112 respectively located near the beveled surface 28 and in line, as will be seen below, with the "feeler" of the measuring head 18. Near its forward end, the rotary handle 104 is drilled and threaded radially to receive a headless set screw 114 which also passes through the alignedly drilled forward part 76 of the stem 70 into the bore 78 therein. The set screw 114 engages a flat-bottomed notch 116 in the rearward end portion of the hollow body 118 of the measuring head 18. The body 118 (FIGURE 2) is provided with a reduced diameter rearward part 120 containing the notch 116, an enlarged diameter intermediate part or pilot part 112 separated from one another by an annular shoulder 123, and a reduced diameter forward part 124 separated from the intermediate part 122 by an annular shoulder 125. The rearward, intermediate and forward parts 120, 122 and 124 have external cylindrical surfaces 127, 129 and 131 respectively, the rearward surface 127 snugly but removably fitting the bore or socket 78 in the forward part 76 of the stem 70. Mounted on the rearward part 120 against the radial shoulder 124 in an annular stop collar, generally designated 126. The latter is drilled and threaded radially to receive a locking set screw 128 by which it is firmly secured in position upon the rearward part 120 of the measuring head body 118. The measuring head body 118 is provided with a central bore 130 coaxial with the bore 80 in the rotary stem 70 and preferably of the same diameter, and is also drilled transversely off-center to receive a rotation-preventing pin 132.

The forward end portion of the forward part 76 of the rotary tubular stem 70 is grooved longitudinally as at 134 (FIGURE 3) to receive in snug but radially slidable relationship a contact bar 136 of generally rectangular "loaf of bread" shape having a cylindrical outer surface 140 which is of substantially the same radius of curvature as the surrounding cylindrical surface 70 and forms an approximate continuation thereof when the contact bar 136 is pressed fully inward into the groove 134 (FIGURE 3). The contact bar 136 adjacent its opposite ends, however, is provided with internal sockets 142 containing helical compression springs 144 by which the contact bar 136 is urged radially outward away from the bottom of the longitudinal groove 134. The contact bar 136 and forward part 122 of the hollow measuring head body 118 are drilled in alignment with one another and the latter threaded to receive a retaining set screw 146 (FIGURES 2 and 3) by which the outward motion of the contact bar 136 is limited.

Snugly but reciprocably mounted within the longitudinal bore 140 in the measuring head body 122 is a forward motion-transmitting rod 148, 148 having a rounded rearward end 150 engageable with the rounded forward end 96 of the rearward motion-transmitting rod 90. The forward motion-transmitting rod 148 has a forward conical end surface 152 extending between the rod 148 and an elongated reduced diameter extension 154. The latter passes across a transverse bore 156 in the reduced diameter forward part 124 of the hollow measuring head body 118 and through a reduced diameter bore 160 coaxial with the bore 130 and terminates within a diametrical slot 162 into which its rounded end 164 projects (FIGURE 2). The longitudinal bore 130 also opens into the transverse bore 156, which snugly but slidably receives a measuring pin or feeler 166 having a rounded contact end 168. The axis of the transverse bore 156 is disposed approximately two degrees more than at right angles to the axis of the bore 130, facilitating sliding of the pin 166. The measuring pin 166 intermediate its opposite ends is provided with a notch 170 into which the conical end portion 152 of the forward motion-transmitting rod 148 projects. The rod end 152 engages a sharp contact edge 172 thereon. As a consequence, the pushing inward of the contact pin or measuring pin 166 causes the sharp edge 172 to slidably engage the conical end portion 152 of the forward motion-transmitting rod 148 and push the latter rearwardly, as explained more fully below in connection with the operation of the invention.

The external surface concentricity measuring attachment 20 (FIGURES 4, 5 and 6) includes an approximately rectangular block 174 having a central horizontal bore 176 (FIGURE 6) snugly but removably fitting the cylindrical forward part 124 of the measuring head body 118, and also has a radial slot 178 extending upward from the horizontal bore 176. The block 174 is drilled transversely of the slot 178 to receive a pivot pin 180 (FIGURE 4) upon which a similarly drilled bellcrank measuring lever 182 is pivotally mounted. The bellcrank lever 182 is equipped with a vertical arm 184 which is engageable with the rounded end 164 of the forward motion-transmitting rod extension 154 when the block 174 is pushed backward so that its rearward face engages the forward face of the workpiece W adjacent the external cylindrical surface E, the concentricity of which is to be measured. The bellcrank lever 182 at its top has a horizontal arm 186 terminating in an inclined end surface 188 from which a contact ball 190 projects downward toward and into engagement with the external surface E of the workpiece W (FIGURE 4). The block 174 is drilled radially as at 192 to receive the threaded shank of a knurled thumbscrew 194 by which the attachment 20 is securely but removably locked upon the reduced diameter forward part 124 of the body 118.

The modified stationary vertical handle, generally designated 214, shown in FIGURES 7, 8 and 9, is interchangeable with the horizontal handle 14 of FIGURES 1 and 2 and is adapted to hold a conventional vertical dial indicator, generally designated 216. The vertical dial indicator 216 differs from the horizontal dial indicator 16 by having its stem 244 and operating plunger 242 projecting rearwardly from the back of its casing 230 rather than from the bottom thereof as in the case of the horizontal dial indicator 16 of FIGURES 1 and 2. The terms "horizontal" and "vertical" with respect to the two dial indicators 16 and 216 are employed merely for convenience in designating the position the particular dial indicator occupies in the handle 14 or 214, rather than to the position it might occupy in some other and different instrument.

The vertical handle 214, like its counterpart 14, has a tubular extension 226 projecting rearwardly from a body portion 222 of approximately cylindrical shape containing an approximately cylindrical recess or socket 224 disposed substantially coaxial with the bore 250 in the tubular shank 226 instead of perpendicular thereto as in the handle 14 of FIGURES 1 and 2. As before, a reduced diameter bore 248 interconnects the recess 224 and counterbore or socket 250. The recess 224 is in the form of a counterbore opening into a reduced diameter bore 228 which is connected by the still smaller bore 248 with the socket 250 (FIGURE 9). A small U-shaped recess 229 is disposed at the bottom of the body 222 at the lower side of the bore 228, and diametrically above it is a groove or slot 231 opening into a U-shaped notch 233 in the rim of the body 222. The body 222 is drilled and threaded as at 235 with radial holes to receive set screws for holding the dial indicator 216 within the bore 228 and counterbore 224.

In the operation of the invention, whether equipped with the horizontal dial indicator and handle 14 of FIGURES 1 and 2 or the vertical dial indicator and handle 214 of FIGURE 7, to check the concentricity of the bore B relatively to the reference bore or counterbore R, the operator slides the workpiece W onto the external surface 129 of the intermediate or pilot part 122 until it engages the front surface 123 of the stop collar 126 of the measuring head body 118, depressing the contract bar 136 at the same time in order to provide a snug fit. At this time, the external surface concentricity measuring attachment 20 has been removed. The resulting engagement of the rounded end 168 of the measuring pin or feeler 166 with the bore I (FIGURE 2) forces the measuring pin 166 inward, causing its sharp contact edge 172 of its notch 170 to push upon the conical portion 152 of the forward motion-transmitting rod 148, moving the latter rearwardly in its bore 130. This motion is transmitted through the rearward motion-transmitting rod 90 to the dial indicator operating plunge 42, whereupon the motion-multiplying mechanism of the dial indicator 16 causes its needle 38 to swing relatively to its graduated scale 36. The dial 34 of the dial indicator 16 can be rotated and locked in position by the thumb screw 37. While the operator holds the handle 14 stationary in one hand he grasps the rotary handle 104 in his other hand and rotates it, consequently rotating the measuring head 18 and causing the end 168 of the measuring pin or feeler 166 to sweep around the internal surface I in a circular path. If the internal surface I is not accurately coaxial with the reference surface or bore R, that fact, and its amount, is indicated by the swinging of the needle 38 back and forth relatively to the graduated scale 36 of the dial 34.

To measure the concentricity of the external surface E of the workpiece W relatively to the reference bore or internal surface R, the operator loosens the thumb screw 194 of the attachment 120 and moves the bore 176 onto the reduced diameter forward portion 124 of the measuring head body 118 until the rearward face of the body 174 engages the forward face of the workpiece W. The consequent engagement of the vertical arm 184 of the bellcrank lever 182 (FIGURE 4) with the forward end 164 of the forward motion-transmitting rod extension 154 pushes the conical portion 152 of the motion-transmitting rod 148 rearwardly out of engageability with the sharp contact edge 172 of the measuring pin or feeler 166, rendering the latter inoperative for the time being. The subsequent engagement of the ball 190 on the horizontal arm 186 of the bellcrank lever 182 with the external surface E to be measured (FIGURE 4) swings the bellcrank lever 182 in a counterclockwise direction around the pivot pin 180, thereby pushing the extension 154 and measuring rod 148 rearwardly, causing the measuring rod 90 to push the dial indicator operating plunger 42 inward relatively to its stem 44, again causing the needle 38 to swing.

The operator again holds the handle 14 stationary in one hand while he rotates the rotary handle 104 with the other hand, causing the contact or feeler ball 188 to sweep around the external surface E, any lack of concentricity of which is indicated by the swinging of the needle or pointer 98 relatively to the graduated scale 36 of the dial 34 on the dial indicator 16, as before. Thus, the concentricity or departure therefrom of the internal surface I and external surface E of the workpiece W relatively to the reference bore or internal surface R can be quickly, easily and precisely measured both qualitatively and quantitatively by the instrument 10 of the present invention.

Whether the horizontal or vertical handle 14 or 214 is used depends upon the conditions of use or measurement, and the dial indicator 16 may be used facing sidewise, as shown for convenience of illustration in FIGURES 1 and 2, or upward, as desired. The measuring head 218 having a different diameter of pilot portion (FIGURE 10) is interchangeable with the measuring head 18, if required for different dimensions of workpiece W to be measured. Change is made by loosening the set screw 114 from the notch 116, and retightening it after the substitution has been made, in a manner obvious to those skilled in this art from the drawings and the foregoing description.

What I claim is:

1. An internal-and-external surface concentricity gauge for use with a conventional dial indicator having a reciprocable operating plunger, said concentricity gauge comprising a stationary supporting structure having a rearward longitudinal passageway therethrough communicating with the dial indicator plunger and having at its rearward end a dial indicator holder, a rotary measuring structure rotatably mounted on said stationary supporting structure and having a forward longitudinal passageway therethrough communicating with said rearward longitudinal passageway, said measuring structure including a measuring unit having a forward part with a transverse bore therein and an intermediate pilot part configured to engage and fit a workpiece reference surface, an internal surface measuring member reciprocably mounted in said transverse bore and having an internal-surface-engaging feeler portion thereon, said measuring member also having a cross passageway therethrough communicating with said longitudinal passageway, an elongated motion-transmitting device reciprocably mounted in said longitudinal passageways and having a rearward portion operatively engaging the dial indicator plunger, and transverse-to-longitudinal motion-converting means mounted on said internal surface measuring member and motion-transmitting device in interengaging relationship with one another and responsive to transverse motion of said measuring member to effect longitudinal motion of said motion-transmitting device,
  said motion-transmitting device also having an extension projecting forwardly therefrom through said cross passageway past said internal surface measuring member and projecting from said forward part of said measuring unit.

2. An internal-and-external surface concentricity gauge, according to claim 1 wherein said intermediate pilot part of said measuring structure has an elongated yieldingly-supported contact member engageable with the workpiece reference surface.

3. An internal-and-external surface concentricity gauge, according to claim 1, wherein said rotary measuring structure includes a rearward measuring unit carrier and wherein said forward measuring unit is removably inserted in said carrier.

4. An internal-and-external surface concentricity gauge, according to claim 3, wherein said motion-transmitting device includes a plurality of motion-transmitting members arranged in tandem and disposed partly within said rearward measuring unit carrier and partly within said forward measuring unit.

5. An internal-and-external surface concentricity gauge, according to claim 1, wherein said transverse bore is disposed with its axis at an angle slightly greater than a right angle relatively to the axis of said forward longitudinal passageway.

6. An internal-and-external surface concentricity gauge, according to claim 1, wherein said internal surface measuring member has a hole therethrough aligned with and containing said extension.

7. An internal-and-external surface concentricity gauge, according to claim 1, wherein said forward part has a recess extending axially inward from the forward end thereof and wherein said extension projects into said recess.

8. An internal-and-external surface concentricity gauge, according to claim 1, wherein said dial indicator holder includes a handle body with a cavity therein configured and adapted to receive the dial indicator in protective relationship therewith.

9. An internal-and-external surface concentricity gauge, according to claim 8, wherein said cavity is disposed with its center line approximately perpendicular to the axis of said rearward passageway.

10. An internal-and-external surface concentricity gauge, according to claim 8, wherein said cavity is disposed with its center line approximately parallel to the axis of said rearward passageway.

11. An internal-and-external surface concentricity gauge, according to claim 1, wherein an external surface concentricity measuring attachment is mounted on the forward end of said forward part and includes a supporting body and an external surface concentricity measuring member movably mounted on said body and engageable with said extension.

12. An internal-and-external surface concentricity gauge, according to claim 11, wherein said external surface concentricity measuring member is pivotally mounted on said supporting body.

13. An internal-and-external surface concentricity gauge, according to claim 12, wherein said external surface concentricity measuring member comprises a bent lever having a first arm engageable with said extension and a second arm engageable with the external surface to be measured.

14. An internal-and-external surface concentricity gauge, according to claim 7, wherein a supporting body is mounted on the forward end of said forward part and wherein an external surface concentricity measuring member is movably mounted on said body and extends into said recess into engagement with said extension.

15. An internal-and-external surface concentricity gauge, according to claim 14, wherein said external surface concentricity measuring member is pivotally mounted on said supporting body.

16. An internal-and-external surface concentricity gauge, according to claim 15, wherein said external surface concentricity measuring member comprises a bent lever having a first arm engageable with said extension and a second arm engageable with the external surface to be measured.

References Cited in the file of this patent

UNITED STATES PATENTS

| 1,329,456 | Carpenter | Feb. 3, 1920 |
| 1,695,453 | Carpenter | Dec. 18, 1928 |
| 1,723,529 | Schwieterman | Aug. 6, 1929 |
| 3,030,709 | Eisele | Apr. 24, 1962 |
| 3,089,247 | Eisele | May 14, 1963 |

FOREIGN PATENTS

| 128,671 | Sweden | June 27, 1950 |